Feb. 11, 1958 R. M. M. OBERMAN 2,823,263
LINE CIRCUIT IN A SIGNALLING SYSTEM
Filed March 30, 1953
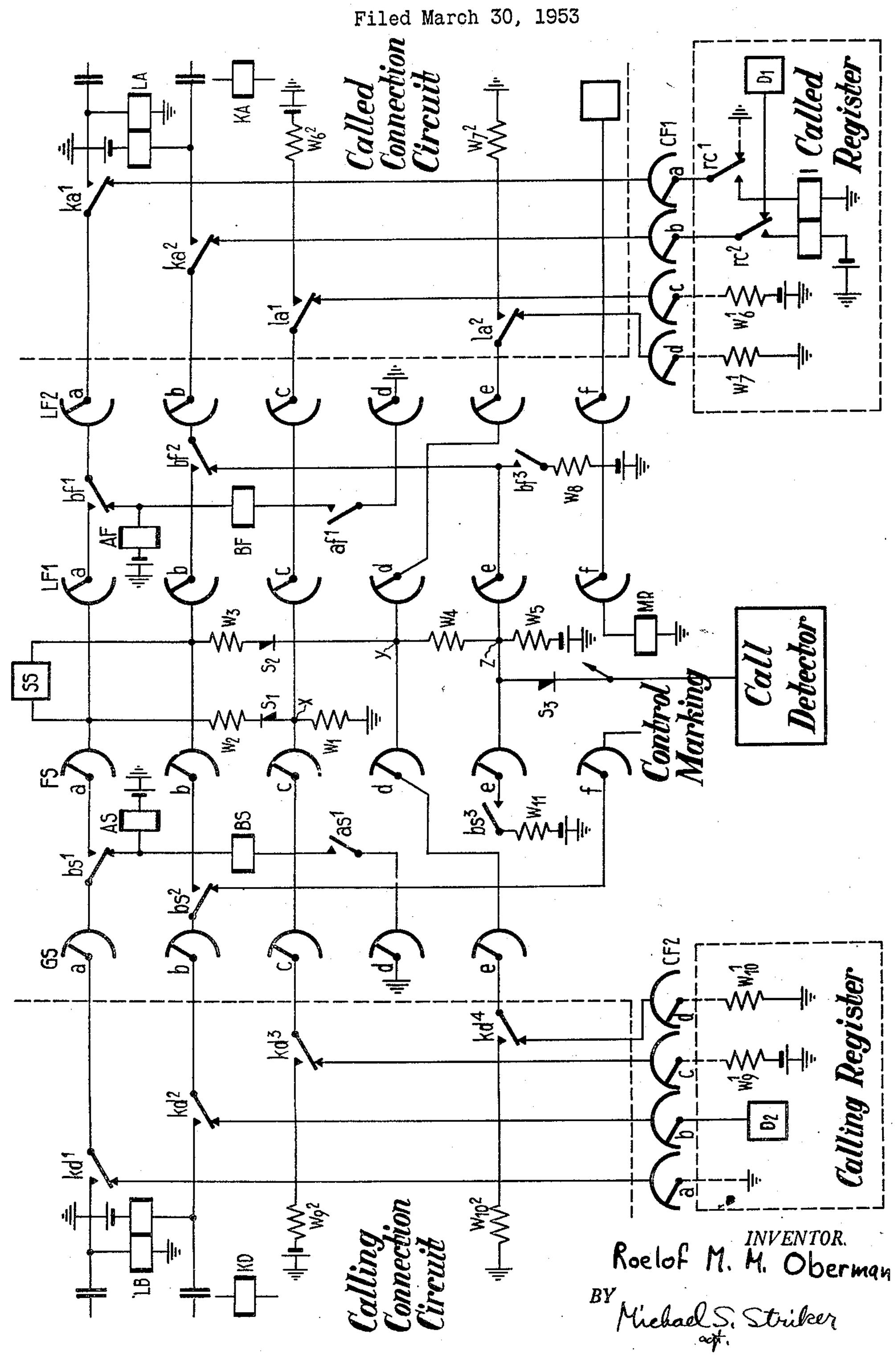
INVENTOR.
Roelof M. M. Oberman
BY Michael S. Striker
agt.

2,823,263
Patented Feb. 11, 1958

2,823,263

LINE CIRCUIT IN A SIGNALLING SYSTEM

Roelof M. M. Oberman, Voorburg, Netherlands, assignor to De Staat der Nederlanden, Ten Deze Vertegenwoordigd Door de Directeur-Generaal der Posterijen, Telegrafie en Telefonie, The Hague, Netherlands Application March 30, 1953, Serial No. 345,548

8 Claims. (Cl. 179—18)

The invention refers to a line circuit in a signaling system, in particular a telephone system in which resistances and rectifier cells are exclusively used for signaling a call or busying a line.

This application is a continuation-in-part of my copending application Serial Number 767,525, filed July 30, 1947, for Line Circuit With Disconnectable Call and Busy Signalization.

It is an object of the present invention to eliminate the noise produced in formerly disclosed line circuits in which resistances of linear or both of linear and nonlinear type are used. The aforementioned noise is the result of the permanent control of the busying and call signalization potentials by the subscriber's set over high ohmic resistances such as disclosed in U. S. Patent No. 2,574,224, issued November 6, 1951, and the U. S. patent application Serial No. 767,532, filed July 30, 1947.

A signaling system according to the present invention comprises, in combination, a line finder, a final selector, the line finder and the final selector each having at least three contact banks, at least three conductors connecting, respectively, corresponding contact banks of the line finder and the final selector to each other, a subscriber's loop connected to two of the three conductors, the two of the three conductors carrying speech currents to and from the subscriber's loop, a series connection including a plurality of resistors, at least one conductive rectifying cell and a direct voltage source, the series connection being connected to the two of the three conductors and to one other of the conductors, whereby on closing of the subscriber's loop the other conductor changes the potential thereof, the other conductor rendering the subscriber's loop busy after the other conductor has changed the potential thereof, and resistive means for restoring the potential of the other conductor to the initial value thereof after a connection has been established by operation of the line finder and the final selector, respectively, whereby the rectifying cell is rendered blocking so as to in effect disconnect the two conductors from the other conductor.

The invention will be explained in detail with reference to the accompanying figure showing a line circuit according to the present invention for one subscriber in an automatic telephone system and some elements necessary for explanatory purposes and consisting of finders and selector switches as disclosed in my copending applications, Serial No. 767,530, filed July 30, 1947, in the Netherlands on October 13, 1945, and Serial No. 249,049, filed October 1, 1951, now Patent No. 2,753,399, in the Netherlands on March 26, 1946, and being a continuation-in-part of Serial No. 767,528, filed July 30, 1947.

The center of the drawing shows the line circuit with the resistors W1, W2, W3, W4 and W5 which are of the linear type and the rectifiers S1 and S2 which are of the non-linear type. The resistor W1 is connected between ground and the *c*-wire of the line circuit which wire is used for indicating the busy condition of a line circuit and thus the busy condition of the associated subscriber's line at junction X as disclosed in the copending application Serial No. 767,532, filed July 30, 1947, and U. S. Patent No. 2,574,224, issued November 6, 1951. The resistor W2 and the rectifier S1 are connected between said *c*-wire and the *a*-wire of the line circuit. The resistor W5 is connected between the negative pole of a battery of which the other side is connected to ground and the *e*-wire at junction Z which is used for indicating a calling line towards the call detector over a rectifier S3 and the contact bank *e* of the first line finder LF1. The resistor W4 is arranged between the *e*-wire and the *d*-wire at junction Y of the line circuit. Resistor W3 and rectifier S2 are inserted between the *d*-wire and the *b*-wire of the shown line circuit.

As is usual in telecommunication systems the *a*- and *b*-wire form part of the connection between another subscriber (not shown) and the shown subscriber's station SS which may be reached over the first line finder LF1 or over the final selector FS. The connections to be made in telecommunication systems extend from a calling subscriber to a called subscriber. Such a connection has to be established and the establishment of a connection requires a means for the establishing of said connection for instance a register.

In case the telecommunication system is a register system, a connection is established by the following stages:

(*a*) The subscriber notifies his wish to obtain the possibility to make a call, e. g. by lifting the hook.

(*b*) The subscriber is connected to a register termed hereinafter the called register, the subscriber then receives dialing tone from the called register, (*c*) The subscriber informs the called register concerning the connection he wishes to obtain e. g. by dialing, (*d*) The called register controls the establishing of a connection according to the wishes of the calling subscriber, (*e*) The called register reaches the called subscriber and disconnects itself and renders the cord connected to the connection circuit effective in the connection from the calling subscriber to the called subscriber, whereas the connection circuit informs the called subscriber that he is called by supplying ringing current to the called subscriber, while the called subscriber is busied, (*f*) The called subscriber takes the phone from the hook and balances his line circuit.

In non-operated condition the potentiometer consisting of the resistors W1, W2, W3, W4 and W5 will be interrupted and the junctions Y and Z will both carry the same potential e. g. −60 volts, while the junction X will be at 0 volts or slightly negative due to line leak. When the subscriber lifts his handset the potentiometer is closed as in the copending application Serial No. 767,532, filed July 30, 1947, so that the potential at junction X will be, if the voltage of the voltage source is assumed to be 60 volts:

$$\frac{R_{W1}}{R_{W1}+R_{W2}+R_{SS}+R_{W3}+R_{W4}+R_{W5}}\times(-60)\text{ volts} \quad (1)$$

the potential at junction Y:

$$\frac{R_{W1}+R_{W2}+R_{SS}+R_{W3}}{R_{W1}+R_{W2}+R_{SS}+R_{W3}+R_{W4}+R_{W5}}\times(-60)\text{ volts} \quad (2)$$

and the potential at junction Z:

$$\frac{R_{W1}+R_{W2}+R_{SS}+R_{W3}+R_{W4}}{R_{W1}+R_{W2}+R_{SS}+R_{W3}+R_{W4}+R_{W5}}\times(-60)\text{ volts} \quad (3)$$

The potential so obtained at junction Z makes the call detector operate over the rectifier S3 which allows the highest potential to pass to said call detector. The call detector gives the signal to a free register (the called register) to start and furthermore signals the information to the called register to what positions the cord finder $CF_1$ and the second line finder $LF_2$ have to be directed in order to reach the group in which the call occurs. The cord finder $CF_1$ and second line finder $LF_2$ are then positioned accordingly, e. g. in the way disclosed in my copending applications Serial No. 767,530, filed July 30, 1947, and Serial No. 249,049, filed October 1, 1951, which is a continuation-in-part of Serial No. 767,528, filed July 30, 1947. The first line finder $LF_1$ which has access to the calling subscriber's line is now seized by the application of ground in the register to the brush and contact bank *a* of the cord finder $CF_1$ so that a circuit is established over back contact $ka^1$ of relay KA, brush and contact bank *a* of the second line finder $LF_2$, back contact $bf^1$ of relay BF, the seizing relay AF, battery and ground so that relay AF is operated. Relay BF remains deenergized in spite of the closing of contact $of^1$ because both sides thereof are connected to ground.

In a way as, for instance, disclosed in the above mentioned copending patent applications, the first line finder $LF_1$ is started for hunting the calling line, which is marked by potentials at junctions Y and Z being different from the negative battery potential. As in the copending application Serial No. 767,532, filed July 30, 1947, and U. S. Patent No. 2,574,224, issued November 6, 1951, it will be assumed that the wire to which the call detector is connected is used for hunting. It is also possible to use the potential at junction Y for this purpose. The potential at junction Z is thus transferred to the called register over the contact bank and brush *e* of the first line finder $LF_1$ to be positioned, back contact $bf^2$ of relay BF, contact bank and brush *b* of the positioned second line finder $LF_2$, back contact $ka^2$ of relay KA, contact bank and brush *b* of the cord finder $CF_1$, contact $rc^2$ which is preferably controlled by a sequence switch (not shown) dependent on the type of register, and to the voltage discriminating device D1.

The potential at junction Z may be used for the purpose as stated in the copending application Serial No. 767,532, filed July 30, 1947, while the potential may be varied according to Formula 3 by introducing different resistance values for the resistor when differently marked subscriber lines are concerned. The principle introduced in the copending application Serial No. 767,532, filed July 30, 1947, by means of which the junctions of two potentiometers are electrically connected and disconnected by a rectifier dependent on the potenials occurring at said junctions may also be used and junction X may thus be connected over the contact bank and brush *c* of the first line finder $LF_1$, contact bank and brush *c* of the second line finder $LF_2$, back contact $la^1$ of relay LA, contact bank and brush *c* of the cord finder $CF_1$ resistor $W_6{}^1$ to battery and ground, while the junction Y may at the same time be connected over contact bank and brush *d* of the first line finder $LF_1$, contact bank and brush *e* of the second line finder $LF_2$, back contact $la^2$, contact bank and brush *d* of the cord finder $CF_1$ over resistor $W_7{}^1$ to ground. The resistance values of the resistors may now be such that $$\text{Potential at X} < \text{potential at Y} \qquad (4)$$

so that the potential at junction X is $$\frac{R_{W^1}}{R_{W6^1}+R_{W1}}\times(-60) \text{ volts} \qquad (5)$$

the potential at junction Y:

$$\frac{R_{W7^1}}{R_{W7^1}+R_{W4}+R_{W5}}\times(-60) \text{ volts} \qquad (6)$$

the potential at junction Z:

$$\frac{R_{W7^1}+R_{W4}}{R_{W7^1}+R_{W4}+R_{W5}}\times(-60) \text{ volts} \qquad (7)$$

It will be assumed that the marking at Z energizes an impulse relay I in the called register for receiving the dialed impulses. The voltage discriminating device $D_1$ registers the potential of junction Z after which, in the usual way, the sequence switch (not shown) or equivalent thereof, is stepped to its next position connecting the impulse relay I to the subscriber's set SS in the manner presently to be described. The sequence switch closes the front contacts $rc^1$ and $rc^2$.

From the copending applications Serial No. 767,530, filed July 30, 1947, and Serial No. 249,049, filed October 1, 1951, which is a continuation-in-part of Serial No. 767,528, filed July 30, 1947, it will be clear that due to the interruption of the ground applied to the seizing relay AF, the switching through relay BF is operated so that the first line finder $LF_1$ is switched through to the calling subscriber. Ground was applied to relay AF in the circuit: from ground over backcontact $rc^1$, brush and contact bank *a* of the cord finder $CF_1$, back contact $ka^1$ of relay KA, brush and contact bank *a* of the second line finder $LF_2$, back contact $bf^1$ of relay BF to relay AF, battery and ground. Relay AF closes upon being operated the contact $af^1$ thereof, thus applying ground from brush and contact bank *d* of the second line finder $LF_2$ to the relay BF. Relay BF will however not be energized as ground is also applied to the other side of its winding. If the ground applied to the relay AF is now interrupted the relay BF will be energized in series with relay AF.

A circuit entirely across from ground over the first coil of the impulse relay I, front contact $rc^1$ which is closed due to the operation of the sequence switch (not shown), brush and contact bank *a* of the cord finder $CF_1$, back contact $ka^1$ of relay KA, brush and contact bank *a* of the second line finder $LF_2$, front contact $bf^1$ of relay BF, brush and contact bank *a* of the first line finder $LF_1$, subscriber's set SS, contact bank and brush *b* of the first line finder $LF_1$, front contact $bf^2$ of relay BF, contact bank and brush *b* of the second line finder $LF_2$, back contact $ka^2$ of relay KA, contact bank and brush *b* of the cord finder $CF_1$, front contact $rc^2$ which is closed due to the operation of the sequence switch, the second coil of the impulse relay I and battery to ground.

The aforesaid stage (*b*) is now reached and the connection to the called register has been established and the subscriber receives in the usual way dialing tone. The call detector is restored to normal as contact $bf^3$ of relay BF connects the negative battery terminal over the low ohmic resistor $W_8$ to junction Z so that the potential of Z is about —60 volts. The impulse relay I has windings having an ohmic resistance of 500 ohms, while the resistance of the subscriber's set is about 500–1,000 ohms so that the potential of the *a*-wire will range from —15 volts to —20 volts and the potential of the *b*-wire from —40 volts to —45 volts.

The ohmic resistances of resistors W4, W5, W8 and $W_7{}^1$ are preferably chosen so that a marking can be provided at junction Z, which thereafter is brought to about —60 volts while the potential of the junction Y may vary from 0 volts to —30 volts (minimally —40 volts). As mentioned hereinbefore, the potential of the junction X is determined by the potentiometer $W_1/W_6{}^1$, this potential varies from —60 volts to —30 volts (maximally —20 volts). Both the rectifiers $S_1$ and $S_2$ will now be nonconductive so that the resistors $W_2$ and $W_3$ and the speech conductors are in effect disconnected and the line loop is balanced in series with the impulse relay I.

From the above it will be clear that in a telecommunication system the resistance value of the resistors $W_1$, $W_4$ and $W_5$ may be dimensioned so that the characteristic potential values for marking are obtained. On the other hand it is obvious that the resistors $W_6$, $W_7$ and $W_8$ have fixed values throughout the entire system.

The stage (*c*) is now reached and in a normal way the subscriber dials, which will result in reaching the subscriber to be called. When the register has terminated its function, the relay KA in the connection circuit is energized from the register so that the battery bridge relay LA is energized in the circuit from ground over the first coil of relay LA, contact $ka^1$ of relay KA, brush and contact bank *a* of the second line finder $LF_2$, contact $bf^1$ of relay BF, brush and contact bank *a* of the first line finder $LF_1$, subscriber's set SS, contact bank and brush *b* of the first line finder $LF_1$, contact $bf^2$ of relay BF, contact bank and brush *b* of the second line finder $LF_2$, contact $ka^2$ of the relay KA, to the second coil of relay LA battery and ground. The relay LA has a winding having the same resistance value as the impulse relay I to which the speech currents are first directed. The relay LA closes its contacts $la^1$ and $la^2$ and switches thus the resistance $W_6^2$, instead of $W_6^1$ in the register, to the *c*-wire of the line circuit and $W_7^2$, instead of $W_7^1$, to the *d*-wire of the line circuit. The metering relay MR is controlled in a known way from the connection circuit for metering according to time and distance.

The above stages *d–f* will be further discussed under the assumption that the shown subscriber is called so that the register has a calling function toward the subscriber. The calling register has access to a cord finder $CF_2$ which has been positioned and over which the group selector GS is positioned. The group selector may for instance be positioned according to the principles explained in the copending U. S. patent applications Serial No. 767,530, filed July 30, 1947, and Serial No. 249,049, filed October 1, 1951, being a continuation-in-part of Serial No. 767,528, filed July 30, 1947. Upon switching through of the group selector GS the seizing relay AS of the final selector FS is energized in the circuit from ground in the register over the brush and contact bank *a* of the cord finder $CF_2$, contact $kd^1$ of relay KD, brush and contact bank *a* of the group selector GS, contact $bs^1$ of relay BS, relay AS to battery and ground. Relay AS applies by means of contact $as^1$ ground from the brush and contact bank *d* of the group selector GS to the winding of relay BS. The final selector FS transfers the control making over contact bank and brush *f* of the final selector FS, contact $bs^2$ of relay BS, contact bank and brush *b* of the group selector GS, contact $kd^2$ of relay KD, contact bank and brush *b* of the cord finder $CF_2$ to the voltage discriminating device $D_2$ until the wanted marking is found. If junction X is at ground potential or slightly negative, the connection to ground is interrupted in the register so that the relays BS and AS are energized in series in the circuit from ground over wiper and contact bank *d* of the group selector GS, contact $as^1$ of relay AS, relay BS, relay AS to battery and ground. If, however, junction X is more negative, then the subscriber is busy and the further procedure may go along the lines of the copending applications mentioned hereinabove.

The stage (*e*) above is now reached and the register releases itself energizing relay KD, thus switching the battery bridging relay LB in the circuit which will be completed by lifting the handset.

It will be clear that if the subscriber is found free that the outlet is immediately busied by the application of negative battery over resistor $W_9^1$ which may be the low ohmic winding of a testing relay or an identical electrical circuit brush and contact bank *c* of the cord finder $CF_2$, contact $kd^3$ of relay KD, brushes and contact banks *c* of the group selector GS and the final selector FS to junction X and the application of ground over resistor $W_{10}^1$, brush and contact bank *d* of the cord finder $CF_2$, contact $kd^4$ of relay KD, brush and contact bank *e* of the group selector GS, brush and contact bank *d* of the final selector FS to junction Y, and the application of negative battery potential over the low-ohmic resistor $W_{11}$, contact $bs^3$, brush and contact bank *e* of the final selector FS to junction Z so that the call detector cannot respond. Upon operation of relay KD the resistors $W_9^1$ and $W_{10}^1$ are replaced by the resistors $W_9^2$ and $W_{10}^2$, respectively, of the same ohmic resistance.

When the subscriber lifts his handset the same condition arises as discussed before.

I claim:

1. In a signalling system; a line finder and a final selector, each having a first, a second and a third contact bank and a first, a second and a third brush adapted to engage said contact banks, respectively; a subscriber's line comprising a first conductor connected to said first contact banks of said line finder and said final selector, a second conductor connected to said second contact banks of said second contact banks of said line finder and said final selector, a third conductor connected to said third contact banks of said line finder and said final selector, and a first, a second and a third resistive means, a current source having one pole connected to said third conductor through said first resistive means and its other pole to said second conductor through said second resistive means, said third resistive means connecting said first conductor with said third conductor, said subscriber's line further including a subscriber's set for electrically connecting said first conductor to said second conductor and closing a circuit from said one pole of said current source connected to said first resistive means to said other pole of said current source connected to said second resistive means; said third resistive means including a non-linear resistance; means connected to one of said first brushes and to one of said third brushes for connecting simultaneously said one pole of said current source to said first conductor and for connecting said other pole of said current source to said third conductor, whereby said non-linear resistance is rendered non-conductive when said means connect simultaneously said one and other pole of said current source to said first and third conductor, respectively, so as to in effect disconnect said first conductor from said third conductor, said means connected to said first and said third brush including a fourth resistive means connected to said one pole and a fifth resistive means and said one pole of said current source; said first, second, third, fourth and fifth resistive means having such ohmic values that said first and fifth resistive means and said second and fourth resistive means respectively, constitute upon connecting independent potentiometers, thereby interrupting the circuit from said one pole of said current source connected to said first resistive means to said other pole of said current source connected to said second resistive means.

2. In a signalling system; a line finder and a final selector, each having a first, a second, a third and a fourth contact bank and a first, a second, a third and a fourth brush adapted to engage said contact banks, respectively; a subscriber's line including a first conductor connected to said first contact banks of said line finder and said final selector, a second conductor connected to said second contact banks of said line finder and said final selector, a third conductor connected to said third contact banks of said line finder and said final selector, a fourth conductor connected to said fourth contact banks of said line finder and said final selector, and a first, a second, a third and a fourth resistance, a first and a second rectifier, a current source having one pole connected to the third conductor through said first resistance and its other pole to said fourth conductor through said fourth resistance, said third resistance and said first rectifier in series connecting said first conductor with said third conductor, said second resistance and said second rectifier in series connecting said second conductor with said fourth conductor, said subscriber's line further including a subscriber's set for electrically connecting said first conductor to said second conductor; a first means connected to one of said first brushes and to one of said third brushes for connecting said one pole of said current source to said first conductor and said other pole of said current source to said third conductor, and a second means connected to one of said second brushes and to one of said fourth brushes for connecting said one pole of said current source to said fourth conductor and said other pole of said current source to said second conductor, whereby said first and said second rectifiers are rendered non-conductive when both said means connect said one pole of said current source to said first and said fourth conductor and said other pole of said current source to said second and said third conductor respectively so as to in effect disconnect said first and said second conductor from said third and said fourth conductor, said first means and said second means being connected to said brushes of said final selector so that, upon answering a call, said subscriber's set is taken in a circuit extending from said one pole of said current source connected to said first brush by said first means to said other pole of said current source connected to said second brush by said second means.

3. In a signalling system; a line finder and a final selector, each having a first, a second, a third and a fourth contact bank and a first, a second, a third and a fourth brush adapted to engage said contact banks, respectively; a subscriber's line including a first conductor connected to said first contact banks of said line finder and said final selector, a second conductor connected to said second contact banks of said line finder and said final selector, a third conductor connected to said third contact banks of said line finder and said final selector, a fourth conductor connected to said fourth contact banks of said line finder and said final selector, and a first, a second, a third and a fourth resistance, a first and a second rectifier, a current source having one pole connected to the third conductor through said first resistance and its other pole to said fourth conductor through said fourth resistance, said third resistance and said first rectifier in series connecting said first conductor with said third conductor, said second resistance and said second rectifier in series connecting said second conductor with said fourth conductor, said subscriber's line further including a subscriber's set electrically connecting said first conductor to said second conductor for initiating a call and closing a circuit from said one pole of said current source connected to said first resistance to said other pole of said current source connected to said fourth resistance; said fourth resistance including a tap for starting a call detection upon closure of the circuit and initiation of a call; a first means connected to one of said first brushes and to one of said third brushes for connecting said one pole of said current source to said first conductor and said other pole of said current source to said third conductor, and a second means connected to one of said second brushes and to one of said fourth brushes for connecting said one pole of said current source to said fourth conductor and said other pole of said current source to said second conductor, whereby said first and said second rectifiers are rendered non-conductive when both said means connect said one pole of said current source to said first and said fourth conductor and said other pole of said current source to said second and said third conductor respectively so as to in effect disconnect said first and said second conductor from said third and said fourth conductor, said first means and said second means being connected to said brushes of said line finder so that upon reaching said calling subscriber's line, said subscriber's set is taken in a circuit extending from said one pole of said current source connected to said first brush by said first means to said other pole of said current source connected to said second brush by said second means.

4. In a signalling system; a line finder and a final selector, each having a first, a second, a third and a fourth contact bank and a first, a second, a third and a fourth brush adapted to engage said contact banks, respectively; a subscriber's line including a first conductor connected to said first contact banks of said line finder and said final selector, a second conductor connected to said second contact banks of said line finder and said final selector, a third conductor connected to said third contact banks of said line finder and said final selector, a fourth conductor connected to said fourth contact banks of said line finder and said final selector, and a first, a second, a third and a fourth resistance, a first and a second rectifier, a current source having one pole connected to the third conductor through said first resistance and its other pole to said fourth conductor through said fourth resistance, said third resistance and said first rectifier in series connecting said first conductor with said third conductor, said second resistance and said second rectifier in series connecting said second conductor with said fourth conductor, said subscriber's line further including a subscriber's set for electrically connecting said first conductor to said second conductor; a first means connected to one of said first brushes and to one of said third brushes for connecting said one pole of said current source to said first conductor and said other pole of said current source to said third conductor, and a second means connected to one of said second brushes and to one of said fourth brushes for connecting said one pole of said current source to said fourth conductor and said other pole of said current source to said second conductor, said first means including a first relay coil connected to said one pole of said current source and said second means including a second relay coil connected to said other pole of said current source, said first and second relay coils constituting a battery bridge relay in a connection circuit so that said subscriber's set is taken in a circuit extending from said one pole of said current source connected to said first relay coil to said other pole of said current source connected to said second relay coil, so as to energize the battery bridge relay and to prevent noise from arising in said subscriber's line, whereby said first and said second rectifiers are rendered non-conductive when both said means connect said one pole of said current source to said first and said fourth conductor and said other pole of said current source to said second and said third conductor respectively so as to in effect disconnect said first and said second conductor from said third and said fourth conductor.

5. In a signalling system; a line finder and a final selector, each having a first, a second, a third, a fourth and a fifth contact bank and a first, a second, a third, a fourth and a fifth brush adapted to engage said contact banks, respectively; a subscriber's line including, a first conductor connected to said first contact banks of said line finder and said final selector, a second conductor connected to said second contact banks of said line finder and said final selector, a third conductor connected to said third contact banks of said line finder and said final selector, a fourth conductor connected to said fourth contact banks of said line finder and said final selector, a fifth conductor connected to said fifth contact banks of said line finder and said final selector, a first, a second, a third, a fourth and a fifth resistance, a first and a second rectifier, a current source having one pole connected to said third conductor through said first resistance and another pole connected to said fifth conductor through said fifth resistance, said second resistance and said first rectifier in series connecting said first conductor with said third conductor, said third resistance and said second rectifier in series connecting said second conductor with said fourth conductor and said fourth resistance connecting said fourth conductor with said fifth conductor; and means connected to one of said first brushes, one of said second brushes, one of said third brushes and one of said fourth brushes of said line finder and said final selector for connecting said one pole of said current source to said first and said fourth conductor, and said other pole of said current source to said second and said third conductor, whereby said first and second rectifiers are rendered non-conductive when said means connect said one pole of said current source to said first and said fourth conductor and said other pole of said current source to said second and said third conductor, respectively, so as to in effect disconnect said first and said second conductor from said third, said fourth and said fifth conductor.

6. In a signalling system as claimed in claim 5, said subscriber's line including a subscriber's set for electrically connecting said first conductor to said second conductor; said means being connected to said brushes of said final selector and including a battery bridge relay having a first coil connecting said one pole of said current source with said first brush of said final selector and connecting said other pole of said current source with said second brush of said final selector, whereby upon answering a call said subscriber's set is taken in a circuit extending from said one pole of said current source connected to said first brush to said other pole of said current source connected to said second brush, the circuit comprising said first and second coil of said battery bridge relay energizing the same.

7. In a signalling system as claimed in claim 5, said subscriber's line including a subscriber's set for electrically connecting said first conductor to said second conductor and closing a circuit from said pole of said current source connected to said first resistance to said other pole of said current source connected to said fifth resistance, said fifth conductor for starting a call detection upon closure of the circuit and initiation of a call by changing the potential thereon; said means being connected to said brushes of said final selector; and means connected to said fifth brush of said final selector for low-ohmically connecting said other pole of said current source to said fifth conductor, whereby upon answering a call said subscriber's set is taken in a circuit extending from said one pole of said current source connected to said first brush to said other pole of said current source connected to said second brush, whereas said means connected to said fifth brush of said final selector prevent said fifth conductor from starting the call detection by keeping the potential thereon at the same level.

8. In a signalling system as claimed in claim 5, said subscriber's line including a subscriber's set for electrically connecting said first conductor to said second conductor for initiating a call and closing a circuit from said one pole of said current source connected to said first resistance to said other pole of said current source connected to said fifth resistance, said fifth conductor for starting a call detection upon closure of the circuit and initiation of a call; said means being connected to said brushes of said line finder; and means being connected to said fifth brush of said line finder for low-ohmically connecting said other pole of said current source to said fifth conductor, whereby upon reaching said calling subscriber's line said subscriber's set is taken in a circuit extending from said one pole of said current source connected to said first brush of said line finder to said other pole of said current source connected to said second brush of said line finder whereas said means connected to said fifth brush of said line finder restores the call detection to normal.

References Cited in the file of this patent

UNITED STATES PATENTS

| | | |
|---|---|---|
| 2,152,889 | Jedrychowski | Apr. 4, 1939 |
| 2,502,415 | Bray et al. | Apr. 4, 1950 |
| 2,502,439 | Deakin | Apr. 4, 1950 |
| 2,543,003 | Den Hertog | Feb. 27, 1951 |
| 2,709,720 | Schauer | May 31, 1955 |